United States Patent
Adams

[15] 3,669,146
[45] June 13, 1972

[54] POWER ASSISTED STEERING SYSTEM

[72] Inventor: Frederick J. Adams, Campton, near Shefford, England

[73] Assignee: Cam Gears Limited, Hitchin Hertfordshire, England

[22] Filed: Jan. 23, 1970

[21] Appl. No.: 5,295

[52] U.S. Cl.............................137/596.2, 180/79.2, 91/368, 91/457, 91/375 A
[51] Int. Cl.........................................................F16k 11/14
[58] Field of Search...................137/596.2, 636.1; 180/79.2; 91/368, 374, 375 A, 457

[56] References Cited

UNITED STATES PATENTS

| | | | |
|---|---|---|---|
| 2,293,555 | 8/1942 | Mercier | 137/596.2 X |
| 2,671,433 | 3/1954 | Meddock | 137/596.2 X |
| 2,685,342 | 8/1954 | Lauck | 91/457 X |
| 2,889,851 | 6/1959 | Audemar | 137/636.1 |
| 3,296,939 | 1/1967 | Eddy | 91/375 |
| 3,408,900 | 11/1968 | Tomita | 180/79.2 X |

Primary Examiner—Henry T. Klinksiek
Attorney—Hill, Sherman, Meroni, Gross & Simpson

[57] ABSTRACT

A power assisted rack and pinion vehicular steering system in which a double acting hydraulic power cylinder is connected to the rack. A power fluid pump is connected to the hydraulic cylinder through a manually operated torque-transmitting and torque-responsive control mechanism including a housing, a rotatable work input shaft adapted to receive a steering wheel, a rotatable work output shaft on which the pinion is formed, a torsion rod connected fast at opposite ends to the work input and output shafts, a valve sleeve connected for joint rotation to the work output shaft and a plurality of poppet valves mounted on the valve sleeve. The work input shaft is so constructed and arranged to actuate the poppet valves in response to relative rotation between the work input and output shafts and to control the flow of fluid between the pump and the hydraulic cylinder to move the rack in a direction corresponding to the direction of rotation of the work input shaft.

3 Claims, 9 Drawing Figures

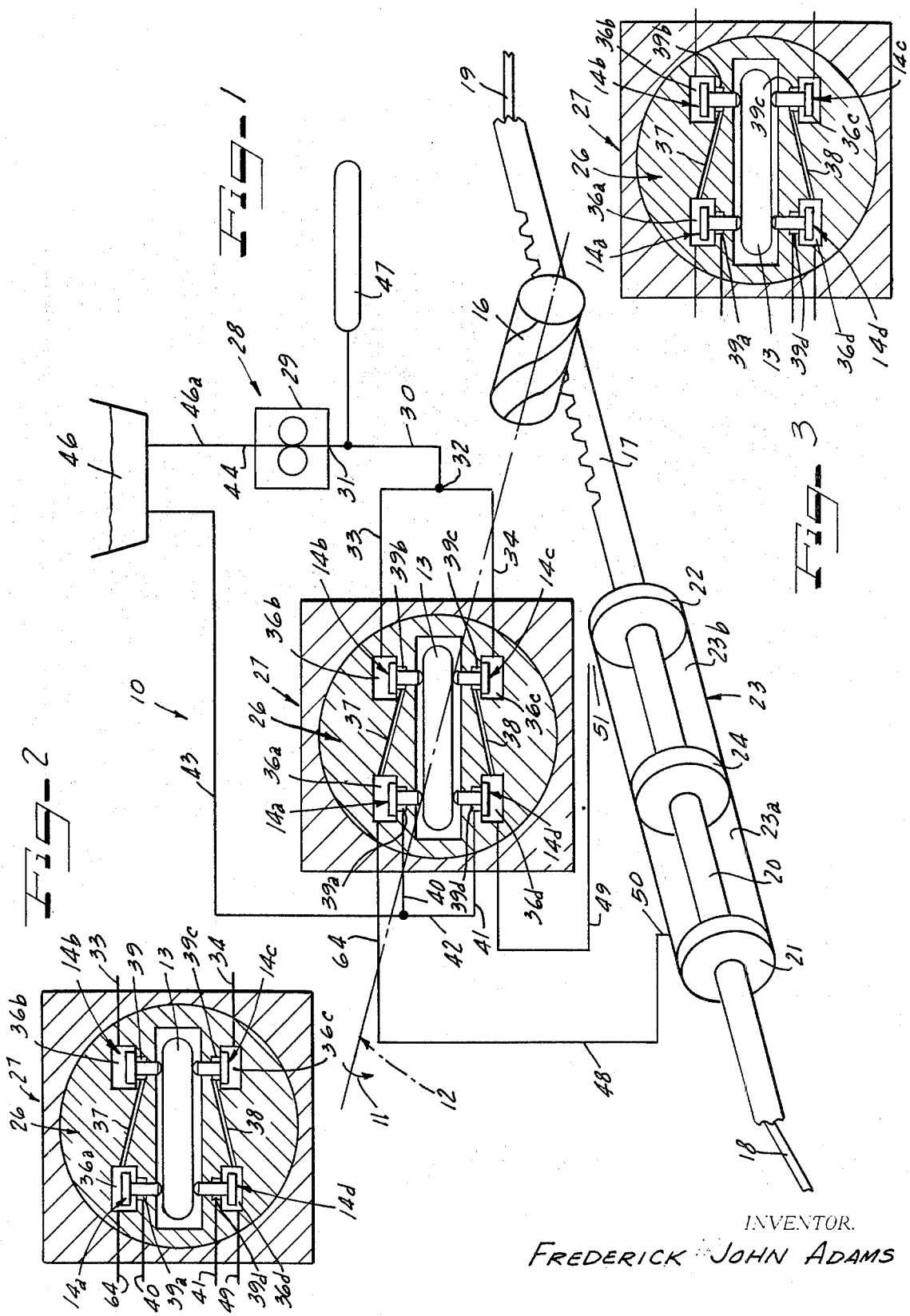

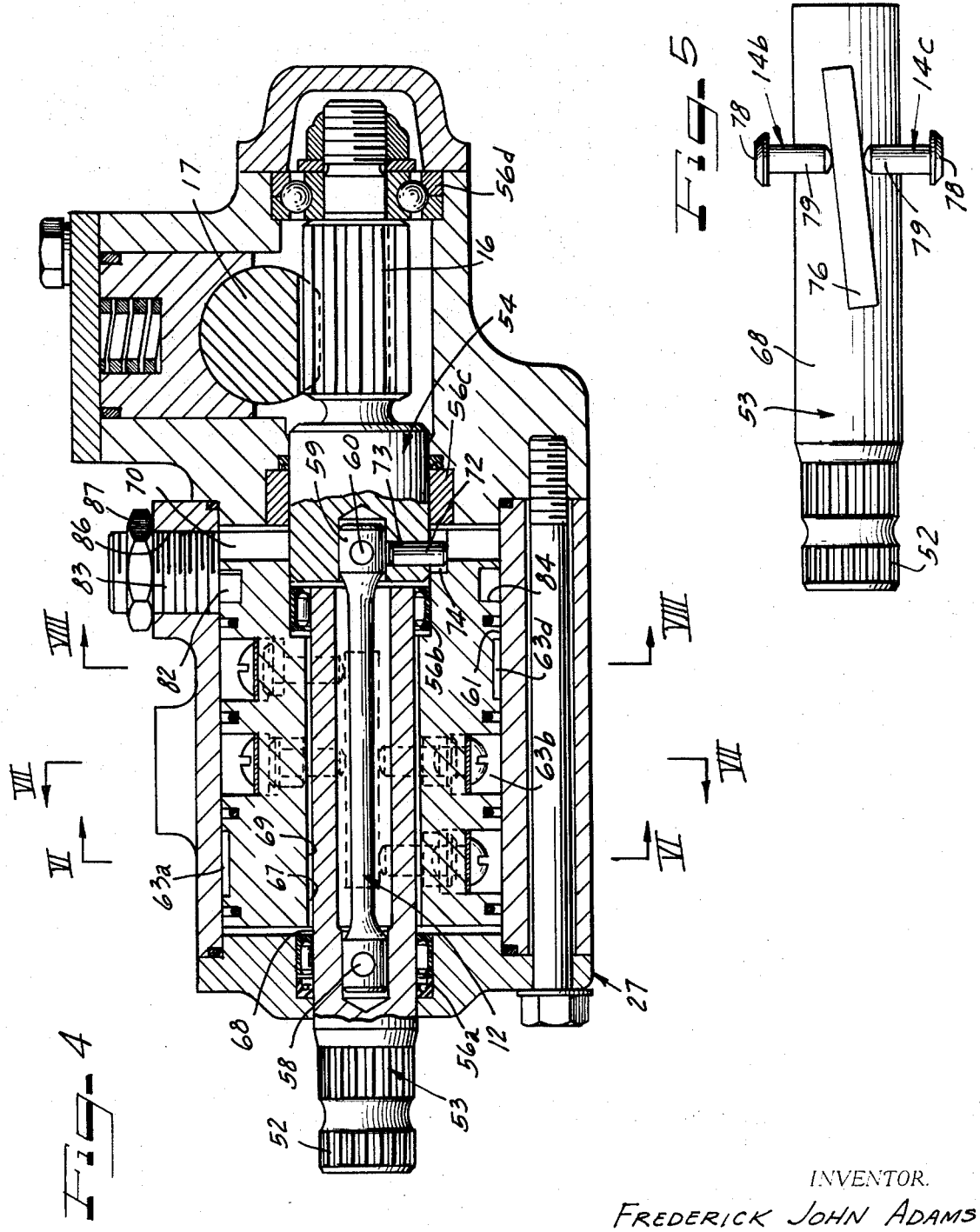

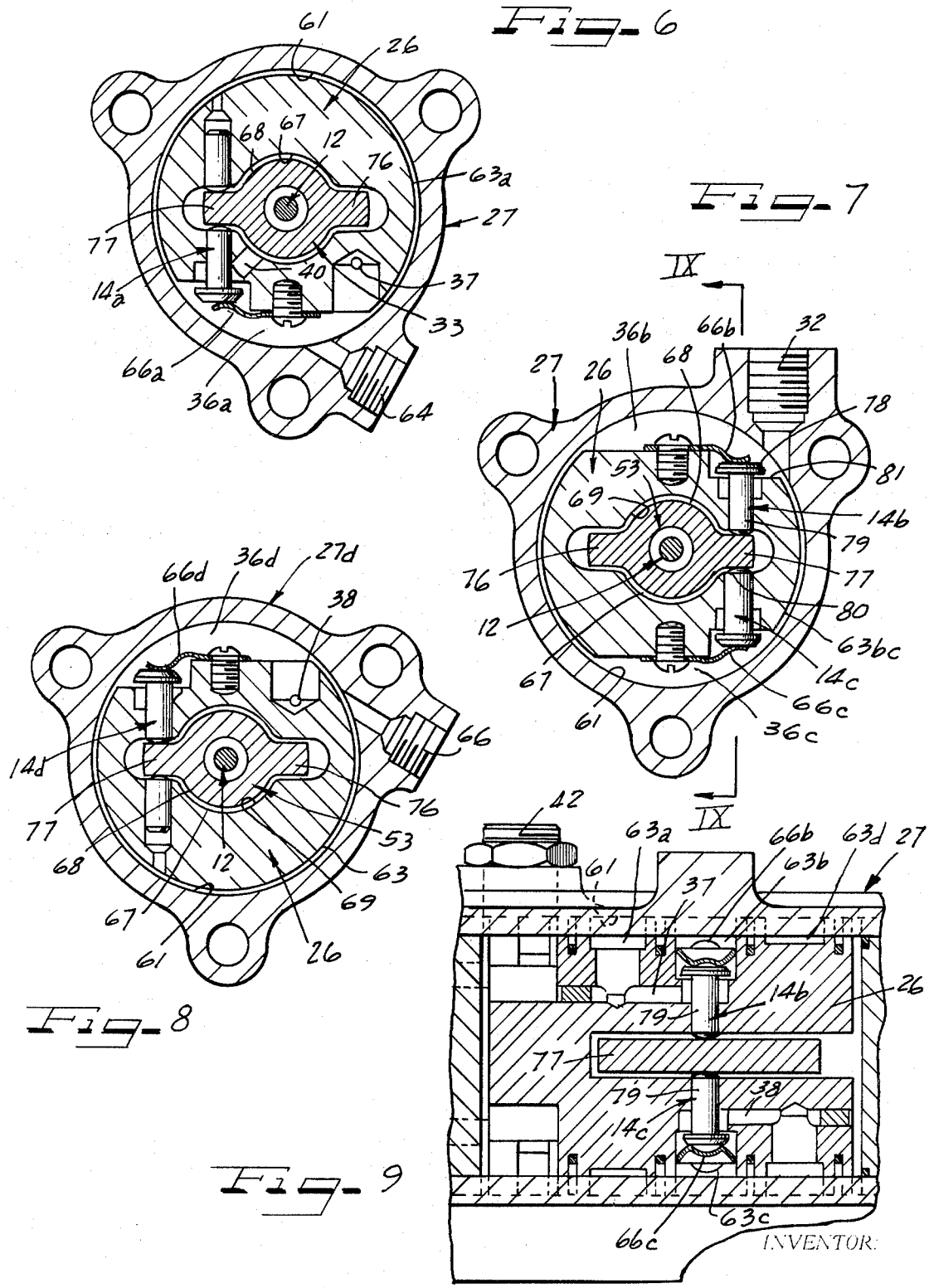

POWER ASSISTED STEERING SYSTEM

BACKGROUND OF THE INVENTION

This invention relates generally to the field of hydraulic servo systems and more particularly to such a system employing a torque-responsive control mechanism for controlling the operation of a servomotor.

Servo systems of this general description are utilized in a variety of applications including vehicular power steering systems. Some such systems employ a work input shaft which is adapted to receive a steering wheel, a work output shaft connected mechanically or hydraulically to the steering linkage of the dirigible wheels of the vehicle, a servomotor such as a hydraulic cylinder arrangement connected to the steering linkage, a main power fluid pump and valve mechanism for controlling the flow of fluid between the pump and the hydraulic cylinder.

The valve mechanism is generally operatively interposed between the work input and output shafts to direct high and low pressure fluid to and from the opposite ends of the hydraulic cylinder in response, in some cases, to mere rotation of the work input shaft, while in other cases, to an increase in torque applied to the work input shaft.

In the latter situation the torque may be developed by means of a torsionally elastic member such as a twistable rod interconnecting the independently rotatable work input and output shafts. In any event, as the work input shaft is rotated relative to the work output shaft, valve means are provided for directing the fluid between the pump and the hydraulic cylinder to turn the dirigible wheels as a function of the direction of rotation of the work input shaft.

In known structures such valve means have generally included one or more relatively rotatable sleeve or spool valves or axially shiftable sleeve valves. While such valve means are entirely satisfactory for a variety of applications the present invention concerns itself primarily with the utilization of an extremely simple and inexpensive valving arrangement to accomplish the function of directing fluid flow between the pump and the hydraulic cylinder.

SUMMARY OF THE INVENTION

The present invention may be summarized as comprising a servomotor controller utilizing a plurality of poppet valves for controlling the flow of fluid to and from the servomotor, and a servo system employing such a controller.

The poppet valves are carried on a rotatable valve sleeve which is journalled in a housing which also journals the work input and output shafts. The valve sleeve is connected to the work output shaft for joint rotation and the poppet valves are actuated by the work input shaft in response to relative rotation between the work input and output shafts and in response to the direction of rotation of the work input shaft.

In the embodiment of the invention illustrated herein a torsion rod interconnects the work input and output shafts for generating a torque as the work input shaft is turned relative to the work output shaft. The torsion rod also biases the two shafts to a center or neutral position, that is, the relative position which obtains when the pressurized fluid-imposed force across the hydraulic cylinder is balanced to maintain the steered wheels at a selected position of steering. Thus in the neutral position of the work input and output shafts the valve mechanism subjects either both ends or neither end of the servo motor or hydraulic cylinder to the high pressure side of the main power fluid pump.

The invention also features means for selectively adjusting the neutral position of the work input shaft. To this end the poppet valves are engaged and actuated by generally axially extending slightly helically twisted feathers formed on the work input shaft. The valve sleeve which carries the poppet valve is axially shiftable and as the valve sleeve is shifted the neutral position of the work input shaft is varied.

In the illustrated embodiment of the invention the servo system comprises a rack and pinion power steering system wherein the pinion is formed integrally on the work output shaft and the torsion rod extends through the center of the work input shaft, thereby reducing overall dimensional requirements. The valve sleeve which carries the poppet valves is also constructed to provide certain fluid flow passageways to and from the poppet valves in a relatively simple and compact manner.

Many other features, advantages and additional objects of the present invention will become manifest to those versed in the art upon making reference to the detailed description which follows and the accompanying sheets of drawings in which a preferred structural embodiment incorporating the principles of the present invention is shown by way of illustrative example only.

BRIEF DESCRIPTION OF THE DRAWING

FIG. 1 is a schematic view of a rack and pinion power steering system incorporating the principles of the present invention and including four poppet valves all of which are in a closed position in the neutral position of the work input shaft.

FIGS. 2 and 3 are similar to a portion of FIG. 1 but FIG. 2 discloses an arrangement wherein two of the poppet valves are closed and two are open in the neutral position of the work input shaft and FIG. 3 discloses an arrangement wherein all four poppet valves are open in the neutral position of the work input shaft.

FIG. 4 is a sectional view of a steering box embodying the principles of the present invention as applied to rack-and-pinion vehicular power steering.

FIG. 5 is a side elevational view of a portion of a mechanism disclosed in FIG. 4.

FIGS. 6–8 are cross-sectional views taken substantially along lines VI—VI, VII—VII, and VIII—VIII, respectively, of FIG. 4.

FIG. 9 is a cross-sectional view taken along lines IX—IX of FIG. 7.

DESCRIPTION OF THE PREFERRED EMBODIMENTS

Although the principles of the present invention are of utility in any hydraulic servo system they find particular utility in vehicular power steering systems and are embodied herein in a rack-and-pinion power steering system.

In the embodiment of the power steering system shown in FIG. 1 and indicated generally at reference numeral 10 a manually operated steering wheel is schematically indicated at reference numeral 11 and a torsion bar or rod connected fast to the steering wheel 11 is indicated at reference numeral 12. The torsion rod 12 may be in effect a continuation of the steering column normally associated with the steering wheel 11.

A flat flanked member 13 is mounted on the torsion rod 12 and is situated between and serves to actuate four poppet valves 14a–14d. The end of the torsion rod 12 remote from the steering wheel 11 is connected to a pinion 16 for joint rotation. The pinion 16 engages a rack 17 which is linked, by means shown schematically at 18 and 19 to the dirigible or steered road wheels of a vehicle.

The rack 17 is continuous with a piston rod 20 which extends through end walls 21 and 22 of a hydraulic cylinder 23 and fixedly mounts a double-acting piston 24.

The poppet valves 14a–14d are mounted in a valve sleeve indicated at reference numeral 26 which is also connected fast for joint rotation to the pinion 16. The valve sleeve 26 is journalled in a stationary housing 27 on which the pinion 16 may also be journalled.

As a torque is imposed on the steering wheel 11 by the operator of the vehicle the resistance to rotation imposed on the pinion 16 by the steered wheels causes the torsion rod 12 and the flat flanked member 13 to twist or rotate slightly within the valve sleever 26. Regardless of the direction of rotation of the member 13 two of the four poppet valves 14a–14d will be opened while two will remain closed.

The housing 27 is connected to hydraulic circuitry indicated generally at reference numeral 28 including a main power fluid pump 29 which is preferably of the positive displacement type. A conduit 30 communicates a high pressure or discharge side 31 of the pump 29 to a fluid opening 32 formed in the housing 27. A pair of branch pipes 33 and 34 respectively communicate fluid from the opening 32 to a pair of upper cavities 36b and 36c formed in the valve sleeve 26 and associated with the poppet valves 14b and 14c.

Another pair of conduits indicated at 37 and 38 interconnect a pair of lower cavities 39b and 39c with a pair of upper cavities 36a and 36d associated with the poppet valves 14a and 14d.

Another pair of fluid conduits 40 and 41 respectively communicate a pair of lower cavities 39a and 39d associated with poppet valves 14a and 14d to another fluid opening 42 formed in the housing 27. A conduit 43 communicates fluid from the opening 42 to a low pressure or suction side 44 of the main power fluid pump 29 via a fluid reservoir 46. A fluid accumulator 47 may be interposed between the pump 29 and the fluid opening 32, as will be understood by those skilled in the art.

The upper cavities 36a and 36d associated with poppet valves 14a and 14d communicate respectively with opposite ends of the hydraulic cylinder 23 via a pair of fluid conduits 48 and 49, which conduits enter the cylinder 23 through openings 50 and 51 disposed so as to be located on opposite sides of the piston 24.

In operation, rotation of the steering wheel 11 may cause a twisting or rotation of the torsion rod 12 and the flat flanked member 13, depending upon the resistance to rotation imposed on the pinion 16 by the steered wheels. If the pinion 16 is not subjected to resistance to rotation the steering wheel 11, the torsion rod 12, the flat flanked member 13, the valve sleeve 26 and the pinion 16 will all rotate together resulting in a corresponding movement of the rack 17, the piston rod 20 and the steered wheels. On the other hand, if the pinion 16 is subjected to any substantial resistance to rotation the pinion 16 and the valve sleeve 26 will initially remain stationary while the torsion rod 12 and the flat flanked member 13 are subjected to a twisting action.

Twisting of the member 13 relative to the valve sleeve 26 will cause two of the four poppet valves 14a–14d to open while the other two will remain closed. The opening of two of the valves 14a–14d will cause high pressure fluid to flow from the pump 29 through either poppet valve 14b or 14c, and thence through upper cavity 36a or 36d to one side 23a or 23b of the hydraulic cylinder 23. Fluid expelled from the opposite end of the hydraulic cylinder 23 will be directed through one of the poppet valves 14a and 14d to the fluid opening 42 and thence through the conduit 43 to the pump 29 via the fluid reservoir 46 and a conduit 46a interconnecting the reservoir 46 and the suction side 44 of the pump 29.

Pressurization of one side 23a or 23b of the hydraulic cylinder 23 will cause the piston 24, the piston rod 20 and hence the rack 17 to move in either of two opposite directions, the effect of which will be to correspondingly rotate the pinion 16 and therefore the valve sleeve 26. Even though the valve sleeve 26 then commences rotation at the same speed and in the same direction as the flat flanked member 13, the two open valves 14a–14d will remain open as long as the requisite torsion is applied to the torsion rod 12. When rotation of the steering wheel 11 ceases a momentary continuation of rotation of the valve sleeve 26 will bring the flat flanked member 13 back to a neutral position with respect to the valve sleeve 26, the neutral or center position being defined as the position of the torsion rod 12 and the flat flanked member 13 relative to the valve sleeve 26 at which the four poppet valves 14a–14b are all closed to terminate power assist to the steered wheels.

In the embodiment shown in FIG. 2, in which parts similar to those shown in FIG. 1 are identified with similar reference numerals, the two poppet valves 14a and 14b remain open in the neutral or center position of the torsion rod 12. As a consequence of this arrangement the opposite ends 23a and 23b of the hydraulic cylinder 23 are always maintained in fluid communication through the valves 14a and 14d in the absence of a torque imposed on the torsion rod 12.

As a result the steered road wheels are able, under the normal castoring forces imposed thereon, to return to the straight-ahead position without assistance from the operator of the vehicle. When only light steering torque is needed the operator will be able to steer the vehicle without power assistance but, as the required torque increases beyond a predetermined level, established by the size of the openings of valves 14a and 14d, one valve 14a–14d will be additionally opened while the other will be closed at a corresponding rate, thereby closing the valve from the pressurized fluid and directing the fluid to a corresponding opposite end of the cylinder 23 to assist the pinion 16 in movement of the rack 17.

The arrangement shown in FIG. 2 may offer advantages in many applications over the arrangement disclosed in FIG. 1 wherein all four of the valves 14a–14d remain closed in the neutral or center position of the torsion rod 12.

The embodiment disclosed in FIG. 3 may be preferred in certain applications in which there is no pressure fluid accumulator 47 or other continuous source of pressurized fluid, as for example when pressure fluid is supplied by an engine driven pump which may not be operated continuously at full pressure.

In the embodiment shown in FIG. 3 all four of the poppet valves 14a–14d are partially and equally open when the flat-flanked member 13 is in a center or neutral position. When the torsion rod 12 is subjected to little or no torque the pressurized fluid will circulate freely through the system under merely nominal pressure.

Only when the torque in the torsion rod 12 exceeds a predetermined level in either sense of direction will the valves 14a–14 operate to direct fluid in the appropriate sense or direction to the servomotor or hydraulic cylinder 23 to assist the operator in steering the vehicle.

The embodiments of the invention shown in FIGS. 1–3 all involve a rack and pinion method of transmitting motion from the steering wheel to the road wheels. The principles of the present invention are sufficiently broad, however, to encompass other transmission methods and apparatus such as a worm and wheel arrangement, a vane-type servomotor and the like.

FIGS. 4–9 are illustrative of an exemplary structural embodiment incorporating the principles of the present invention as contrasted with the more diagrammatic showings of FIGS. 1–3. Where helpful to the understanding of the invention, however, reference numerals used in FIGS. 1–3 are also used for similar or corresponding parts shown in FIGS. 4–9.

Thus, in FIGS. 4–9 a steering wheel (such as that indicated schematically at reference numeral 11 in FIG. 1) may be splined to an end 52 of a steering shaft or column 53 which may be conveniently referred to as a work-input shaft. The shaft is journalled in the housing indicated generally at 27 and is axially aligned with another shaft 54 which may be referred to as a work-output shaft. The pinion 16 may be formed integrally with the work output shaft 54. Bearing members 56a–56 may be mounted in the housing 27 for supporting the work input and output shafts 53 and 54.

The torsion rod 12 is connected fast at one end 57 to the steering column or work input shaft 53 by means of a pin 58 and an opposite end 59 is connected fast to the work output shaft 54 for joint rotation therewith by means of a pin 60. Thus the shafts 53 and 54 are relatively rotatable to the extent afforded by the torsion rod 12.

Valve sleeve 26 is journalled within a cylindrical chamber formed within the housing 27 by means of a chamber wall 61. An outer diametrical or peripheral wall 62 which engages in sliding relation the chamber wall 61 is grooved to provide a plurality of axially spaced annularly shaped grooves 63a, 63bc and 63d. Groove 63a is associated with poppet valve 14a, groove 63bc is associated with poppet valves 14b and 14c and groove 63d is associated with poppet valve 14d. Fluid opening 32 (FIGS. 1 and 7) which communicates the pump 29 with the upper cavities 36b and 36c, communicates with the center groove 63bc. Another fluid opening 64 (FIGS. 1 and 6) is formed in the housing 27 to communicate the fluid conduit 48 with the upper cavity 36a of the poppet valve 14a. Another fluid opening 66 (FIGS. 1 and 8) communicates fluid conduit 49 with the upper cavity 36d while the fluid opening 42 (FIGS. 1 and 9) communicates fluid conduit 43 with the lower cavities 39a and 39d through conduits 40 and 41.

It will be appreciated from FIGS. 6–9 that the poppet valves 14a–14 are axially spaced along the central axis of the valve sleeve 26. Furthermore, the valve sleeve 26 comprises axially spaced flattened portions to form the upper fluid cavities 36a–36 while the lower cavities 39a–39d are formed within the valve sleeve 26. In the embodiment shown in FIGS. 4–9 the four poppet valves 14a–14d are maintained in a closed position in the center or neutral position of the torsion rod 12 by virtue of a plurality of springs indicated respectively at 66a–66.

In addition to conduits 37 and 38 (FIGS. 1 and 9), which communicate, respectively, the lower cavity 39b with the upper cavity 36a and the lower cavity 39c with the upper cavity 36d, the lower cavities 39a and 39d are interconnected by means of the passageway 40 (FIGS. 1 and 6) which communicates the lower cavity 36a with a hollow chamber 67 formed between an outer wall 68 of the steering column or work input shaft 53 and an inner wall 69 of the valve sleeve 26. The chamber 67 corresponds to the conduit 41 shown in FIG. 1 and communicates with the fluid opening 42 through a chamber 70 formed within the housing 27 axially adjacent the valve sleeve 26.

As noted, the torsion rod 12 extends through an axial chamber 71 formed in the work input shaft 53. The valve sleeve 26 is coupled to the work output shaft 54 (and thus the pinion 16) by virtue of a pin 72 carried within a complementarily shaped bore 73 formed within the work output shaft 54 and residing at its opposite end in an axially extending slot 74 formed in the valve sleeve 26.

The four poppet valves 14a–14d are actuated by means of a pair of axially elongated ribs or feathers 76 and 77 formed on the work input shaft 53 within the axial confines of the valve sleeve 26. The interior chamber wall 69 of the valve sleeve 26 is formed so as to accommodate the feathers 76 and 77. Each of the poppet valves comprises a valve head 78 and a valve stem 79 which extends through an aperture 80 formed in the chamber wall 69. A valve seat 81 is also formed on the valve seat 26 for each of the poppet valves 14a–14d and separates the upper and lower cavities thereof when the valve is in a closed position.

The valve stems 79 of the valves 14a–14d extend tangentially to the aligned axes of the torsion rod 12 and the work input shaft 53. In order to vary the center or neutral position of the shaft 53 with respect to the poppet valves 14a–14d the ribs or feathers 76 and 77 are, as indicated in FIG. 5, formed with a slight helical twist. The valve sleeve 26 may be shifted axially within the housing 27 by means of a stud 82 (FIG. 4) which projects from a threaded member 83 radially inwardly into a circumferentially continuous slot or groove 84 which is formed in the outer wall 62 of the valve sleeve 26. The member 83 is mounted in a threaded bore 86 formed in the housing 27 and has formed integrally therewith a nut-shaped cap 87 to accommodate a simple hand tool such as a wrench. It is noted that the slot 74 formed in the valve sleeve 26 to accommodate the pin 72 which interconnects the work output shaft 54 and the valve sleeve 26 is axially elongated. Thus by suitable rotation of the threaded member 83 the valve sleeve 26 can be shifted axially, the consequence of which being that the points of abutment between the valve stems 79 and the feathers 76 and 77 are adjusted to selectively control the neutral position of the shaft 53 with respect to the poppet valves 14a–14d.

As illustrated and described herein the valves 14a–14d are conventional mushroom-headed valves with integral stems sliding in guides. Other poppet-type valves which include a valve member closing against an annular seat and operated by the equivalent of a valve stem may be utilized. For example, the valves 14a–14d may be spherical balls coacting with annular seats and unseated by short push-rods sliding in the valve seat 26.

Although minor modifications might be suggested by those versed in the art it should be understood that I wish to embody within the scope of the patent warranted hereon all such modifications as reasonably come within the scope of my contribution to the art.

What I claim is:

1. Valve mechanism for use in power assisted steering and the like systems having a main power fluid pump and a double acting fluid operated servomotor comprising a valve housing having fluid openings adapted for connection to the high and low pressure sides of the main pump and to the opposite ends of the servomotor, respectively, relatively rotatable work input and work output shaft means mounted on said housing, torsionally elastic means interconnecting said work input and work output shaft means, and means including a plurality of poppet valves mounted on one of said shaft means and operative in response to relative rotation between said shaft means for communicating the high pressure side of the main pump with one or the other of the two ends of the servomotor depending upon the direction of rotation of said work input shaft means, said poppet valves being arranged in first and second pairs and including means forming for each valve a valve seat and upper and lower cavities on opposite sides of the valve seat, said upper cavities of both pairs of valves and said lower cavities of said second pair of valves each communicating with different ones of said fluid openings, said lower cavities of said first pair of valves communicating respectively with the upper cavities of said second pair.

2. A hydraulic servomotor control mechanism comprising a housing having a high pressure port, a low pressure port and a pair of working ports, a work input shaft and a work output shaft mounted for rotation on said housing, a valve sleeve connected to said work output shaft for joint rotation therewith, a plurality of poppet valves mounted on said valve sleeve, means communicating said ports and said poppet valves, and means on said work input shaft for operating said poppet valves in response to relative rotation between said work input and work output shafts to control fluid communication between said ports within said housing, said housing comprising wall means forming an axial valve chamber in said housing in which said valve sleeve resides and about the axis of which said valve sleeve rotates, said valve sleeve having wall means partitioning said valve chamber between said chamber wall and said valve sleeve into axially spaced circumferentially continuous annular chambers communicating respectively with said high pressure port, said low pressure port and said working ports.

3. A hydraulic servomotor control mechanism comprising a housing having a high pressure port, a low pressure port and a pair of working ports, a work input shaft and a work output shaft mounted for rotation on said housing, an axially shiftable valve sleeve carried in said housing and connected to said work output shaft for joint rotation therewith, a plurality of poppet valves mounted on said valve sleeve, means communicating said ports and said poppet valves, and means on said work input shaft for operating said poppet valves in response to relative rotation between said work input and work output shafts to control fluid communication between said ports within said housing, said work input shaft and said valve sleeve being axially aligned and said valve sleeve being centrally apertured to receive said work input shaft, said poppet valves having stems extending to said aperture transversely of the axis of rotation of and for engagement by said work input shaft, said means on said work input shaft for operating said poppet valves comprising means forming a plurality of generally axially extending slightly helically twisted feathers for engaging said poppet valve stems, means operatively interconnecting said housing and said valve sleeve for shifting said valve sleeve axially with respect to said feathers to selectively vary the neutral position of said work input shaft relative to said work output shaft.

* * * * *